June 14, 1960 M. E. FRANCISCO 2,940,361
MIRROR MOUNTING APPARATUS
Filed Nov. 8, 1954

MARSHALL E. FRANCISCO
INVENTOR
HUEBNER, BEEHLER,
WORREL & HERZIG
ATTORNEYS
BY Richard M. Worrel

United States Patent Office 2,940,361
Patented June 14, 1960

2,940,361

MIRROR MOUNTING APPARATUS

Marshall E. Francisco, 1065 Vermont St., San Jose, Calif.

Filed Nov. 8, 1954, Ser. No. 467,419

5 Claims. (Cl. 88—98)

The present invention relates to mounting members and more particularly to an improved mounting apparatus for mirrors and similar articles.

It has been conventional practice for many years to provide automotive vehicles with rear view mirrors conveniently viewable from the driving compartments thereof. The mounting apparatus of this invention is particularly useful with such mirrors, but as the description proceeds, it will become apparent that it has utility in other environments as well, especially where the mirrors, or the like are subject to displacement from adjusted position by vibration, jarring or actual physical contact.

Automobile rear view mirrors are mounted in a variety of places, depending upon body style, driver convenience and other considerations. In general they are mounted on the outside of the vehicle adjacent to the windshield or inside the vehicle in some central position, either above or below the windshield. The conventional mounting consists of a frictionally held universal connection permitting manual adjustment by swivelling movement but intended to resist displacement incident to vehicle vibration.

Anyone who has ever driven a vehicle incorporating a mirror with such a mounting soon realizes the disadvantages thereof. Such mirrors are difficult to adjust to individual convenience and to retain in adjustment. If, for example, the mounting is sufficiently loose for ease of adjustment, it departs from adjustment as the vehicle is driven. If further loosened by automotive vibration or deliberately, the mirror flops aimlessly around upon slight vibration, completely loses its utility and becomes an annoying distraction. If the mounting is tightened to hold the mirror in position, its adjustment is extremely difficult.

Again, when the mirror is accidentally or purposely displaced while the vehicle is moving, the temporary lack of rear vision as well as the distracting efforts to readjust the mirror are conducive to hazards of the character every driver wishes to avoid.

The described difficulties are made more onerous by the frequency with which mirror displacement occurs. It is not unusual for the occupants of automobiles to displace the mirror for use in observing personal attire, make-up, hair condition and the like. Such displacement requires readjustment if the mirror is to serve its intended purpose. Service station attendants, car washers, and others working in or about automobiles also frequently displace the mirrors. The broad essence of the present invention resides in the discovery of an apparatus for mounting mirrors and the like which permits adjustable positioning thereof and once adjusted insures return to adjusted position when intentionally or inadvertently displaced therefrom by bending of a resiliently flexible portion thereof.

An object of this invention is to provide an improved mounting device for mirrors and similar articles.

Another object is to provide a mirror mounting device adapted to permit universal adjustment of the mirror to selected positions, its dependable retention in such positions against vibration and the like tending toward accidental displacement thereof, its deliberate displacement by forces applied thereagainst, and its automatic return to precise pre-set position when the displacing forces are removed.

Another object is to provide a mounting device for mirrors adapted upon application of pressure to permit displacement of the mirror from a predetermined adjusted attitude by distortion of a resiliently flexible portion thereof and to return the mirror to the precise predetermined attitude upon release of such pressure.

Another object is to provide a mounting arrangement for an automotive mirror which permits convenient mounting and adaptation to selected viewing positions, fixedly and dependably retains the mirror in such position when subjected to jarring, vibration or shock of automotive operation, is temporarily displaceable from such positions under application of sufficient pressure thereagainst, and which returns the mirror to original position upon release of the displacing pressure.

Other objects are to provide a mirror mount in accordance with the foregoing objects especially adapted for use with vehicle rear view mirrors which is easily installed and set, eliminates hazards of adjustment while driving, has temporary utility as an auxiliary mirror because of its displaceability, resist displacement incident to the vibrations and shocks of vehicle operation, is displaceable to permit cleaning and polishing access therearound, is simple and economical and highly effective for its intended purposes.

These and other objects will become more fully apparent upon reference to the following description and drawings.

Figure 1:
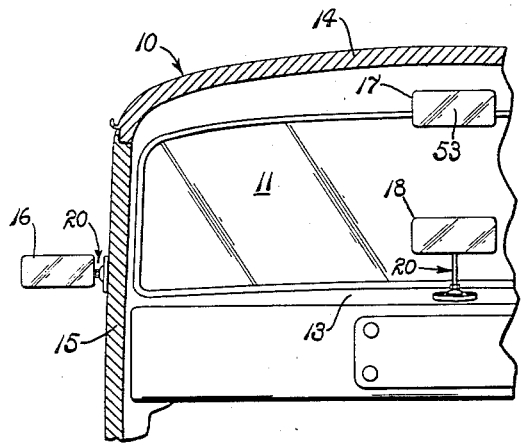
Figure 1 is a fragmentary transverse cross section through an automotive vehicle showing the present invention incorporated therein.
Figure 2:
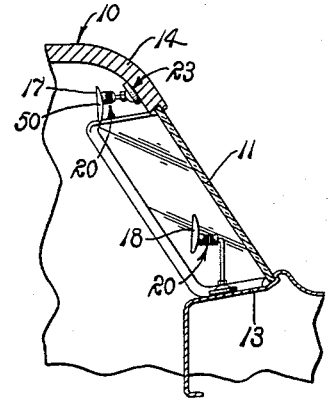
Figure 2 is a fragmentary longitudinal cross section through the vehicle of Figure 1.

Referring more particularly to the drawing:

Although the mirror and mounting device therefor of the present invention are not limited to use on vehicles, they are conveniently described in association therewith. A vehicle 10 is fragmentarily shown in Figures 1 and 2 with the portions thereof illustrated in which mirrors of the nature provided by the present invention are generally mounted. Among the conventional portions of the vehicle which are noted here for descriptive reference are a windshield 11, a dash board shelf or cowling 13, a roof panel 14 and a door or side panel 15. Rear view mirrors 16, 17 and 18 are mounted respectively, outside the vehicle on the side panel, inside the vehicle on the roof panel and on the dash board shelf. Most vehicles are only equipped with one or perhaps two rear view mirrors, but in order to illustrate the advantages of the present invention, mirrors have been provided at the three most popularly employed locations. It is to be understood that the invention is not limited to any specific number or placement of mirrors, nor in fact to their use in a vehicle, as mentioned above. Further, the mounting may also be employed to mount other objects in various environments.

This invention relates to the mounting device, indicated generally at 20. The principles of the invention are the same regardless of the position in which the mirror is placed or supported and thus the following discussion will refer to the upper inside mirror 17, it being understood that the mounting arrangements for mirrors 16 and 18 are the same.

The mounting device 20 includes a bracket 23 providing an annular rim or base 24 located in a predetermined plane having a plurality of holes 25. The bracket is fixedly secured to the roof panel 14 by inserting screws 26 through holes 25 and into the panel. Bracket 23 further provides a spherically surfaced socket 27 having a central opening 28, an inner concave surface 29 and an outer convex surface 30.

Further, the mounting device 20 includes a mounting member 35 having an elongated threaded shank 36 extended through the opening 28 in the bracket. The shank is of somewhat smaller diameter than opening 28 and for this reason the shank fits loosely within the opening. A spherically surfaced disc 37 is provided on the mounting member having a convex surface 38 complementarily fitted to the concave surface 29 of the mounting bracket socket 27. The mounting member is thus universally coupled to the mounting bracket for movement into a variety of angular positions within limits defined by the relative diameters of opening 28 and shank 36. The shank extends from the disc and an adjusting nut 39 is threadably fitted on the shank for tightening against the mounting bracket whereby the shank may be rigidly fixed in any of its angular positions. An enlarged head 40 is provided on the opposite end of the shank from the disc having a flat mounting surface 41.

Figure 3:
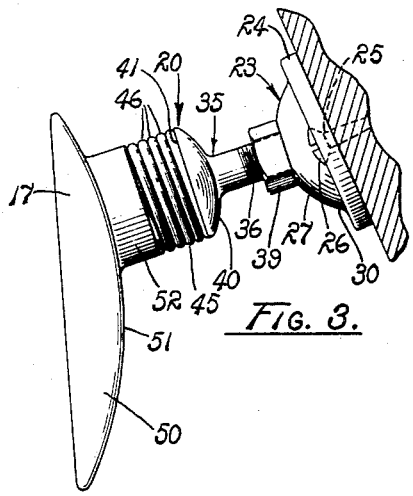
Figure 3 is a somewhat enlarged side view of a mirror mounted on the vehicle of Figures 1 and 2 by the mounting device of the present invention.
Figure 4:
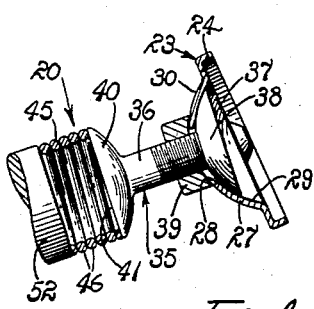
Figure 4 is a detail view of the mounting device with portions thereof shown in cross section.
Figure 5:
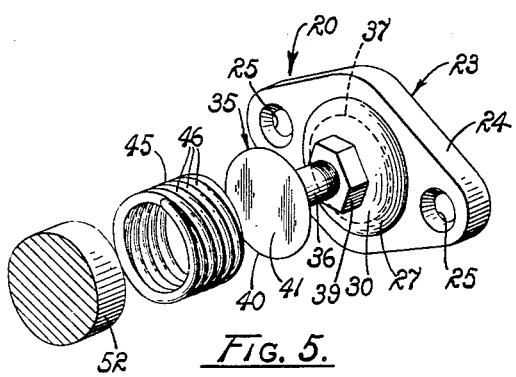
Figure 5 is an exploded perspective view of the mounting device as shown in Figure 4.

The mounting device 20 also includes a relatively short length of a helical spring 45 having a plurality of convolutions 46. These convolutions are tightly wound so that adjacent convolutions are maintained in intimate engagement unless separated by overcoming the force of the spring. One of the end convolutions is rigidly connected, as by welding, to the mounting surface 41 of the mounting member 35 so that the axis of the spring when in normal or static condition, as shown in Figure 3, is in collinear alignment with the longitudinal axis of shank 36 of the mounting member. Because of its tightly and closely wound construction, the spring is resistant to longitudinal or axial deflection as well as to endward separations of the convolutions. Nevertheless, the spring will yield under application of sufficient manual pressure to displacement from its static position of axial alignment with the shank or to longitudinal displacement. However, once such pressure is relieved the spring is adapted to return to the precise axial position in which it was previously placed with little or no axial oscillation.

The mirror 17 may be of any suitable form such as that shown, including a housing 50 providing a back surface 51 with a rearwardly extended boss 52. The reflecting surface 53 of the mirror is mounted in the front of the housing. The boss is rigidly connected, as by welding, to the end convolution 46 of spring 45 opposite the convolution connected to mounting member 35. It will be apparent that the mirror is mounted for movement controlled by the universally coupled bracket 23 and mounting member 35 and by the spring 45. It will, of course, be apparent that the structure described for universal adjustment may be provided at the opposite end of the spring adjacent to the mirror or, for that matter, at both ends of the spring, if preferred. Also, any equivalent structure accommodating adjustment and subject to being secured after adjustment may be substituted for the ball and socket structure shown.

*Operation*

The operation and utility of the present invention is believed to be readily apparent and is briefly summarized at this point. The mirror 17 and mounting device 20 of this invention are connected to a support, such as the roof panel 14 of a vehicle 10, by first fitting the mounting bracket 23 to such panel. For this purpose, screws 26 are inserted through holes 25 in the rim 24 and into the roof panel and tightened therein.

Supported in this manner, the reflecting surface 53 of the mirror 17 faces rearwardly of the vehicle 10 in the normal way. Adjusting nut 39 is then loosened on the shank 36 until the shank is free to swivel around on the mounting bracket 23. The mirror housing 50 is grasped and the mirror moved into an attitude permitting rear vision in the reflecting surface 53. The spherically surfaced disc 37 and socket 27 accommodate a variety of angular positions to suit various heights of persons and various seating positions in the driver's seat. The nut is then tightened against the mounting bracket and the mirror thereby fixed in the desired predetermined attitude. Since spring 45 is relatively axially rigid, the mirror is not permitted to flop, dangle or oscillate around the shank 36 during adjustment thereof or after it is fixed in the desired position. In practice, the mirror is held solidly since the spring is strong enough to resist displacement incident to normal jarring, shock or vibration of the vehicle during road travel.

The mirrors 16 and 18 and their associated mounting devices are mounted similarly to mirror 17 and the comments above apply equally thereto.

The mirror may be grasped manually and moved into a displaced position for temporary auxiliary purposes such as for use as a face mirror in applying make-up or the like. When released in such displaced position, spring 45 snaps the mirror back into the precisely predetermined attitude in which it was previously adjusted.

If the mirrors are inadvertently brushed against by service station attendants or others while cleaning the mirror or the car, or otherwise so as to cause bending of the springs 45, they immediately return to desired position without requiring tedious readjustment. Additionally, mirrors having such mounting arrangements readily flex, to permit dusting and polishing of the dashboard shelf 13 in the case of mirror 18 for example, or to permit access to positions adjacent to the mirrors without in any way affecting the setting adjustment of the mirror.

It will be apparent from the foregoing that a highly convenient and adaptable mounting arrangement for mirrors has been provided. Such mounting eliminates many of the difficulties previously attendant to rear view mirrors in vehicles and to an added safety factor thereto. As explained above, however, the mounting arrangement is not to be limited to use in vehicles but is adapted for use in many other environments as will be readily apparent to those familiar with the art.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. In combination with a mirror having a rear mounting surface, a mounting bracket, a shank having a longitudinal axis, means mounting the shank on the bracket for adjustable movement of the shank into a plurality of horizontal extended angular positions relative to the bracket, a helical spring having adjacent convolutions in engagement providing an axis and having an end convolution connected to the shank and an opposite end convolution connected to the mirror, the spring being positioned with the axis thereof substantially colinear with the axis of the shank and supporting the mirror thereon, the spring being of such strength in relation to the weight of the mirror that the adjacent convolutions of the spring are held in intimate engagement in opposition to the weight of the mirror imposed thereon.

2. In an automotive vehicle, the combination of a base, a mirror, and an adjustable linkage interconnecting the mirror and the base adapted to support the mirror in adjusted positions on the base and although accommodating displacement of the mirror by forces applied thereagainst being adapted upon removal of said forces to return the mirror to adjusted position, said linkage comprising a universally adjustable member, means for releasably locking the member in adjusted position, and a helical spring having an end rigidly connected to the adjustable member and an opposite end connected to the mirror having engaging adjacent convolutions, said spring being of sufficient strength to maintain its adjacent convolutions in engagement in opposition to the weight of the mirror supported thereon, the locking member being releasable to permit adjustment of the universal member so that the spring and mirror can be selectively positioned and being lockable to hold the base and end of the spring connected thereto in position while accommodating displacement of the mirror by bending of the spring.

3. A mounting apparatus for the rear view mirror of an automotive vehicle comprising a base, a universally adjustable member mounted on the base, releasable means for locking the adjustable member in adjusted position, a helical spring having engaging adjacent convolutions providing an end connected to the base and an oppositely substantially horizontally extended end, and means on the extended end of the spring mounting a rear view mirror thereon, said spring being of sufficient strength to maintain its adjacent convolutions in engagement in opposition to the weight of the mirror supported thereon, the locking member being releasable to permit adjustment of the universal member so that the spring and mirror can be selectively positioned and being lockable to hold the base and end of the spring connected thereto in position while accommodating displacement of the mirror by bending of the spring.

4. A rear view mirror for an automotive vehicle comprising a bracket adapted to be attached to such a vehicle, the bracket having a base located in a predetermined plane; a shank swively mounted on the bracket and outwardly extended therefrom; means mounted on the shank engaging the bracket releasably holding the shank in swively adjusted position on the bracket in selected angular relation to the plane of the base; a mirror having a reflective side and an opposite side; and a helical spring having engaging adjacent convolutions providing one end rigidly connected to the shank, an opposite end connected to said opposite side of the mirror, and being substantially horizontally extended therebetween, said spring normally holding the mirror in selected relation to the plane of the base but being resilient to accommodate deliberate or inadvertent displacement of the mirror from selected position subsequent to which the spring returns the mirror to position.

5. A rear view mirror for an automotive vehicle comprising a bracket adapted to be attached to such a vehicle; an elongated rigid shank mounted on the bracket, outwardly extended therefrom, and having a longitudinal axis; a head rigidly secured to the outwardly extended portion of the shank having a substantially circular flat mounting surface; an elongated helical spring having a plurality of engaging adjacent convolutions of uniform diameter substantially equal to the diameter of the mounting surface, a longitudinal axis, and being of a predetermined length, there being opposite endmost convolutions, one of the endmost convolutions being rigidly concentrically connected to the mounting surface of the head; a mirror having a reflective side and an opposite side; and a boss rigidly connected to said opposite side of the mirror and having a substantially circular flat mounting surface of substantially the same diameter as the mounting surface of the head and being concentrically rigidly connected to the endmost convolution of the spring opposite to the endmost convolution connected to the head, the spring being of such strength in relation to the weight of the mirror supported that the adjacent convolutions are retained in intimate engagement until separated by an independent force imposed thereon, the length of the spring being such as to return the convolutions to intimate engagement after being separated by such an independent force without appreciable vibratory movement of the spring.

References Cited in the file of this patent

UNITED STATES PATENTS

| | | |
|---|---|---|
| 718,309 | Brown | Jan. 13, 1903 |
| 1,220,069 | Capdevila | Mar. 20, 1917 |
| 1,446,164 | D'Eyraud | Feb. 20, 1923 |
| 1,487,635 | Watts | Mar. 18, 1924 |
| 1,590,421 | Coffman | June 29, 1926 |
| 1,599,066 | Rushmore | Sept. 7, 1926 |
| 1,989,437 | Weisz | Jan. 29, 1935 |
| 2,034,785 | Wappler | Mar. 24, 1936 |
| 2,488,316 | Mosby | Nov. 15, 1949 |
| 2,534,495 | Younghusband | Dec. 19, 1950 |
| 2,616,649 | Grosse | Nov. 4, 1952 |
| 2,724,996 | O'Shei | Nov. 29, 1955 |

FOREIGN PATENTS

| | | |
|---|---|---|
| 2,792 | Australia | July 7, 1932 |